(12) United States Patent
Bates et al.

(10) Patent No.: US 6,385,531 B2
(45) Date of Patent: *May 7, 2002

(54) DISTRIBUTED SYSTEM AND METHOD FOR DETECTING TRAFFIC PATTERNS

(75) Inventors: Cary Lee Bates; Paul Reuben Day, both of Rochester; Jeffrey Michael Ryan, Byron; John Matthew Santosuosso, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/853,558

(22) Filed: May 11, 2001

Related U.S. Application Data

(63) Continuation of application No. 09/542,680, filed on Apr. 3, 2000.

(51) Int. Cl.[7] .................................................. G06F 7/70
(52) U.S. Cl. ........................ 701/117; 701/118; 701/119; 340/992
(58) Field of Search ................................ 701/117, 118, 701/119, 200, 207, 210, 213; 342/46, 357.06, 357.1, 357.01; 340/905, 910, 988, 992

(56) References Cited

U.S. PATENT DOCUMENTS

| | | | |
|---|---|---|---|
| 4,982,332 A | 1/1991 | Saito et al. ................. | 364/449 |
| 5,369,588 A | 11/1994 | Hayami et al. .............. | 364/449 |
| 5,428,545 A | 6/1995 | Maegawa et al. ............ | 364/444 |
| 5,602,739 A | 2/1997 | Haagenstad et al. ........ | 364/436 |
| 5,712,632 A | 1/1998 | Nashimura et al. ......... | 340/995 |
| 5,732,383 A | 3/1998 | Foladare et al. ............. | 701/117 |
| 5,790,974 A | 8/1998 | Tognazzini .................. | 701/204 |
| 5,874,905 A | 2/1999 | Nanba et al. ................ | 340/995 |
| 5,906,654 A | 5/1999 | Sato ............................. | 701/210 |
| 5,908,464 A | 6/1999 | Kishigami et al. ........... | 701/208 |
| 5,911,773 A | 6/1999 | Mutsuga et al. ............. | 701/200 |
| 5,926,118 A | 7/1999 | Hayashida et al. .......... | 340/995 |
| 5,931,888 A | 8/1999 | Hiyokawa .................... | 701/208 |
| 5,938,721 A | 8/1999 | Dussell et al. ............... | 701/211 |
| 5,959,577 A | 9/1999 | Fan et al. .............. | 342/357.13 |
| 6,282,486 B1 * | 8/2001 | Bates et al. .................. | 701/117 |

* cited by examiner

*Primary Examiner*—Yonel Beaulieu
(74) *Attorney, Agent, or Firm*—Moser, Patterson & Sheridan, L.L.P.; Gero G. McClellan

(57) ABSTRACT

A computer system for determining traffic patterns and congestion and using the determined traffic patterns and congestion to determine an appropriate route using a global positioning system and related route map calculator. A vehicle is provided with an onboard computer system adapted to determine travel time of a vehicle in a road segment and calculate a route based on this information. In addition, this information can be distributed to or otherwise shared with other vehicles and similar information can be received from other vehicles to provide a distributed network for generating and sharing experienced traffic patterns. The information can also be used to predict traffic patterns as well.

29 Claims, 11 Drawing Sheets

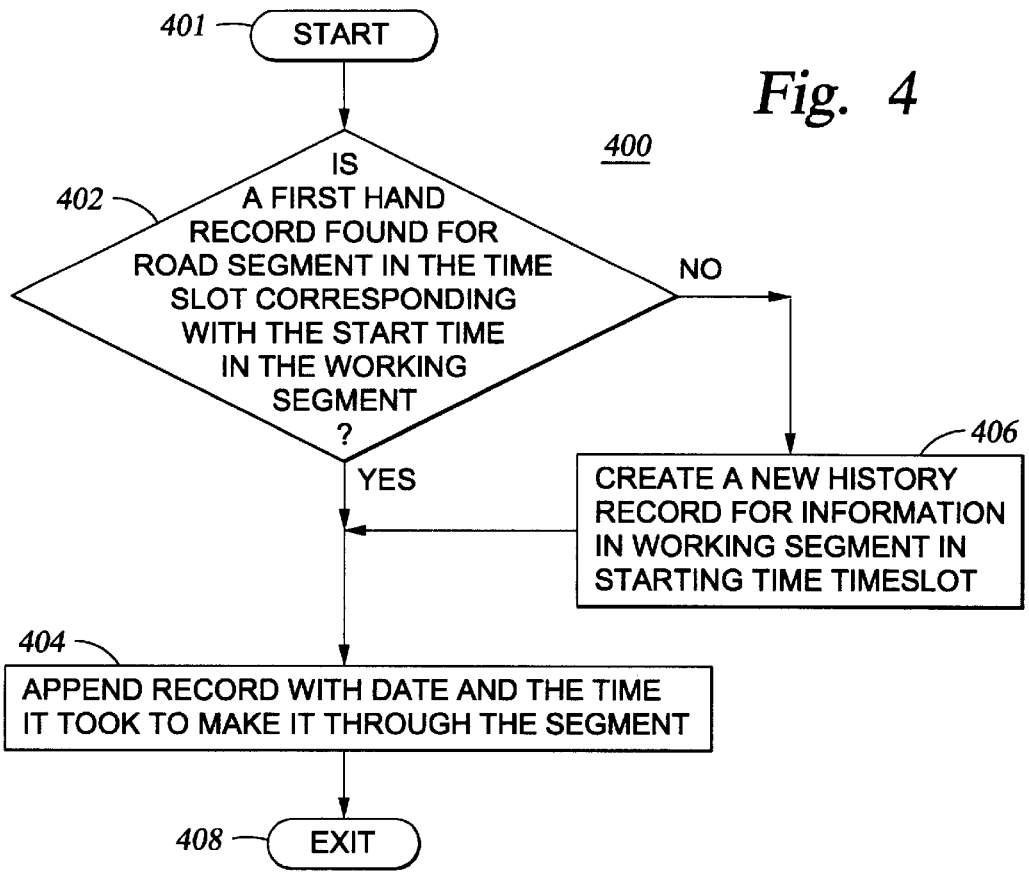
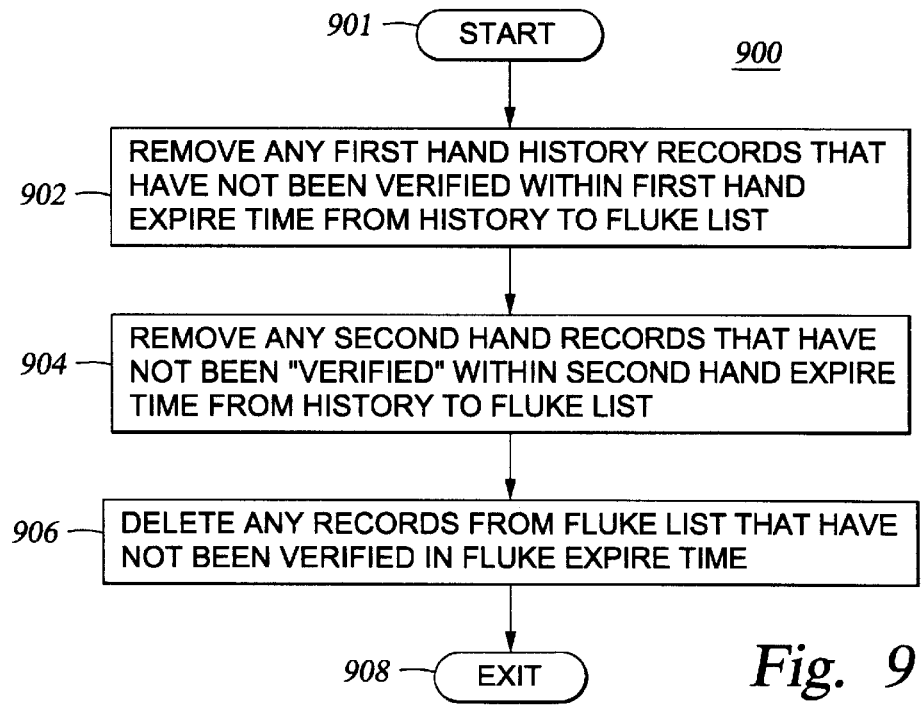

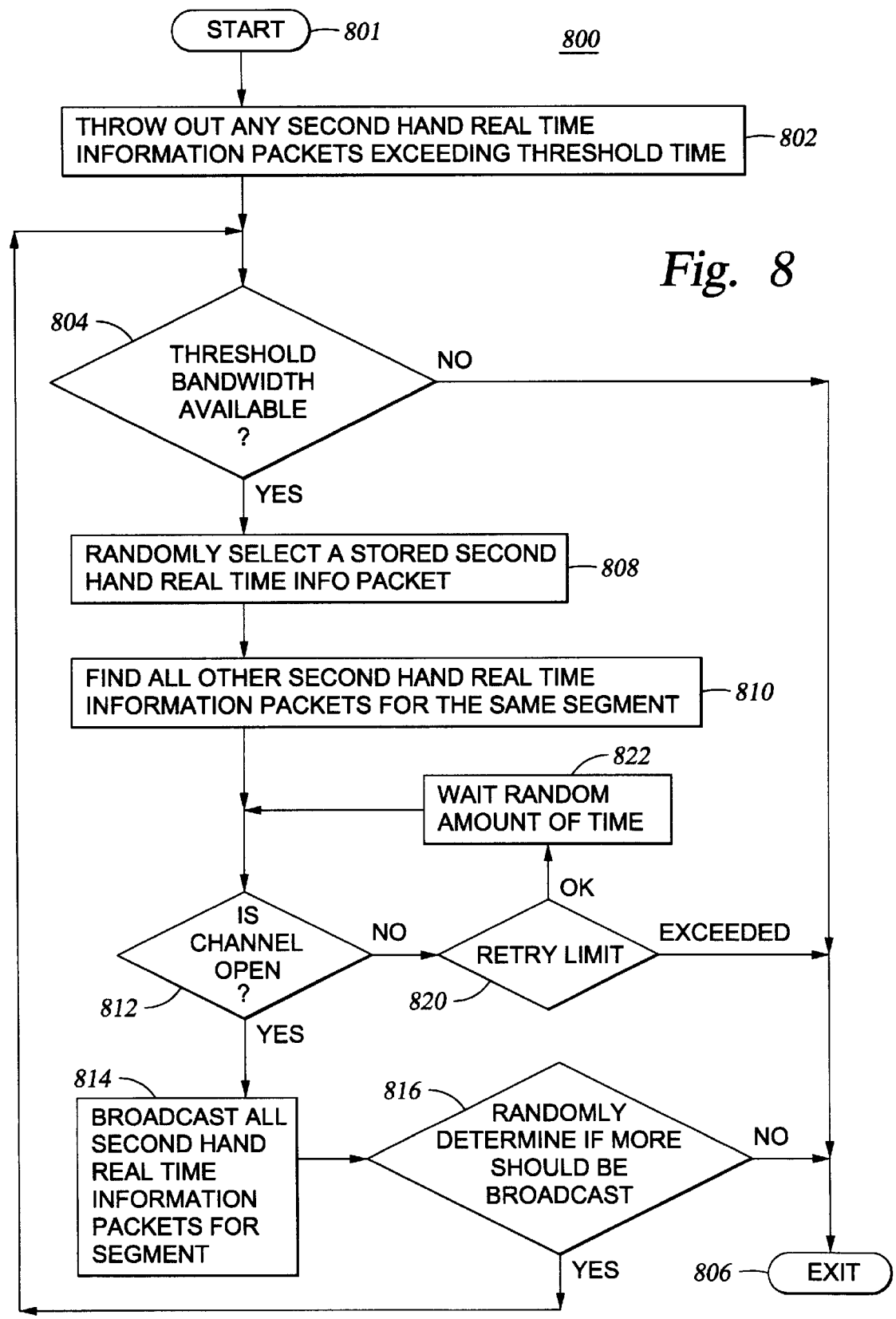

DISTRIBUTED SYSTEM AND METHOD FOR DETECTING TRAFFIC PATTERNS

This is a continuation of Ser. No. 09/542,680 filed on Apr. 3, 2000.

BACKGROUND OF THE INVENTION

1. Field of the Invention

The present invention relates to a computer system and method for identifying traffic patterns and providing route information.

2. Background of the Related Art

The use of on board navigational devices, such as global positioning devices, is becoming widespread in the automotive industry. These devices are capable of plotting the location of a vehicle in which the device is used on a map and even providing directions from one location to another.

In addition to determining the location of a vehicle, these devices can be connected to a service which provides information about traffic patterns along a route chosen by the operator. The operator can pay a fee to a service provider and receive information the service provider has assimilated. The service provider receives traffic information from traditional sources such as air borne vehicles cameras and /or designated drivers who relay the information to the service provider. Unfortunately, this service can be expensive and does not necessarily provide real time information about traffic conditions. In addition, the compilation and dissemination of information by the service can be labor intensive.

Other devices are known which can determine the congestion along a particular route using a speed detecting means and comparing the speed with a known value representing the posted speed along the route. The device then provides a route which is believed to avoid the congestion that has been detected.

One problem with this system is that the device does not know about the congestion until the vehicle and the operator experience the congestion. As a result, the information cannot be used to prevent a driver from selecting a route based upon information that the chosen route has or is experiencing congestion.

Therefore, there is a need for a system and method for identifying traffic patterns and determining routes and/or congestion using known navigational systems which utilize the identified information.

SUMMARY OF THE INVENTION

In one aspect of the invention, a computer system is provided comprising one or more traffic information receivers and transmitters configured to receive and transmit traffic condition information; a system location receiver configured to determine a position of the system; and a signal processing unit comprising a processor and a memory coupled to the one or more traffic information receivers and transmitters and the system location receiver, wherein the signal processing unit is configured to perform the steps of determining a first and a second position of the system along a road segment; determining an elapsed time between the first and second positions of the computer system; and determining whether the elapsed time indicates a congested traffic condition along the road segment by comparing the elapsed time with a stored time value for the road segment.

In another aspect of the invention, a method for processing traffic pattern information is provided comprising determining a first position for a vehicle in a road segment at a first time; determining a second position for the vehicle in a road segment at a second time; determining an elapsed time by comparing the first time and the second time; and determining whether a congested traffic condition exists for the road segment according to the elapsed time.

In another aspect, the invention provides a signal-bearing medium containing a program which, when executed by one or more processors, performs the steps of determining a first position for a vehicle in a road segment at a first time; determining a second position for the vehicle in a road segment at a second time; determining an elapsed time by comparing the first time and the second time; and determining whether a congested traffic condition exists for the road segment according to the elapsed time.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a flow diagram of a method of updating a history database.

FIG. 8 is a flow diagram of a method of broadcasting second hand information.

FIG. 9 is a flow diagram of a method of cleaning up a history database.

DETAILED DESCRIPTION OF THE PREFERRED EMBODIMENT

The present invention generally provides a computer system for identifying traffic patterns and congestion and providing routing and mapping information based on the determined traffic patterns and congestion. The system generally includes aspects which determine the time period a vehicle has been in a road segment and compares this information to a known value for the road segment to determine if the time is acceptable. Information about various road segments can be determined by multiple vehicles and shared between vehicles approaching the road segment.

In one aspect, the system generally operates by determining the rate of travel of a vehicle through a road segment and then determining traffic patterns based on this information. This information can then be transmitted to other vehicles to alert other vehicle operators of existing or historical traffic patterns. The recipients of the broadcast information can then re-broadcast this information after a predetermined amount of time to continue to provide information concerning traffic patterns to other vehicle operators in a defined area. The traffic information can also be stored in one or more databases for future reference and/or broadcast. The information generated and shared by multiple systems can be used by a route calculator of a mapping system to determine an acceptable route.

Figure 1:
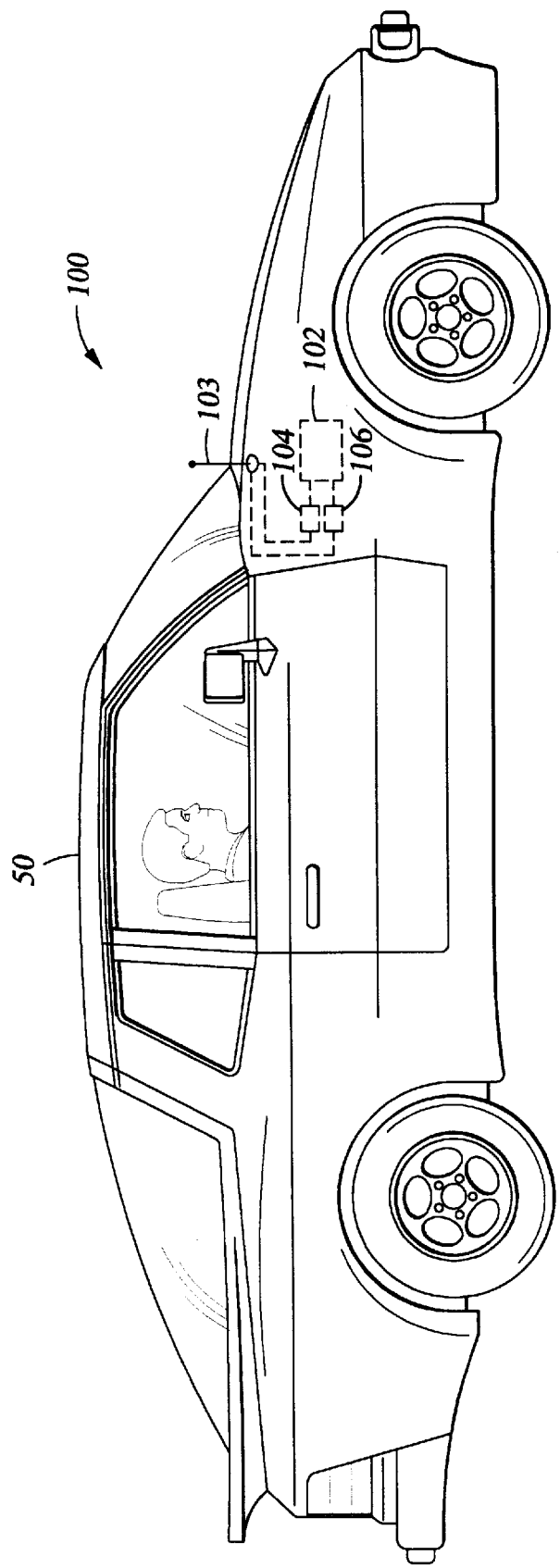
FIG. 1 is a schematic representation of a vehicle having a computer system of the invention.

FIG. 1 is a schematic representation of a vehicle 50 having an onboard computer processing system 100 for detecting traffic patterns and congestion and providing routing information based on the detected or predicted traffic patterns. The system 100 generally includes a signal processing system 102, a receiver 104, a transmitter 106 and an antenna 103. The transmitter 106 may be any known device capable of broadcasting FCC approved frequencies, such as 49 MHz to 900 MHz. In addition, while not necessary, short wave devices could also be used.

Figure 2:
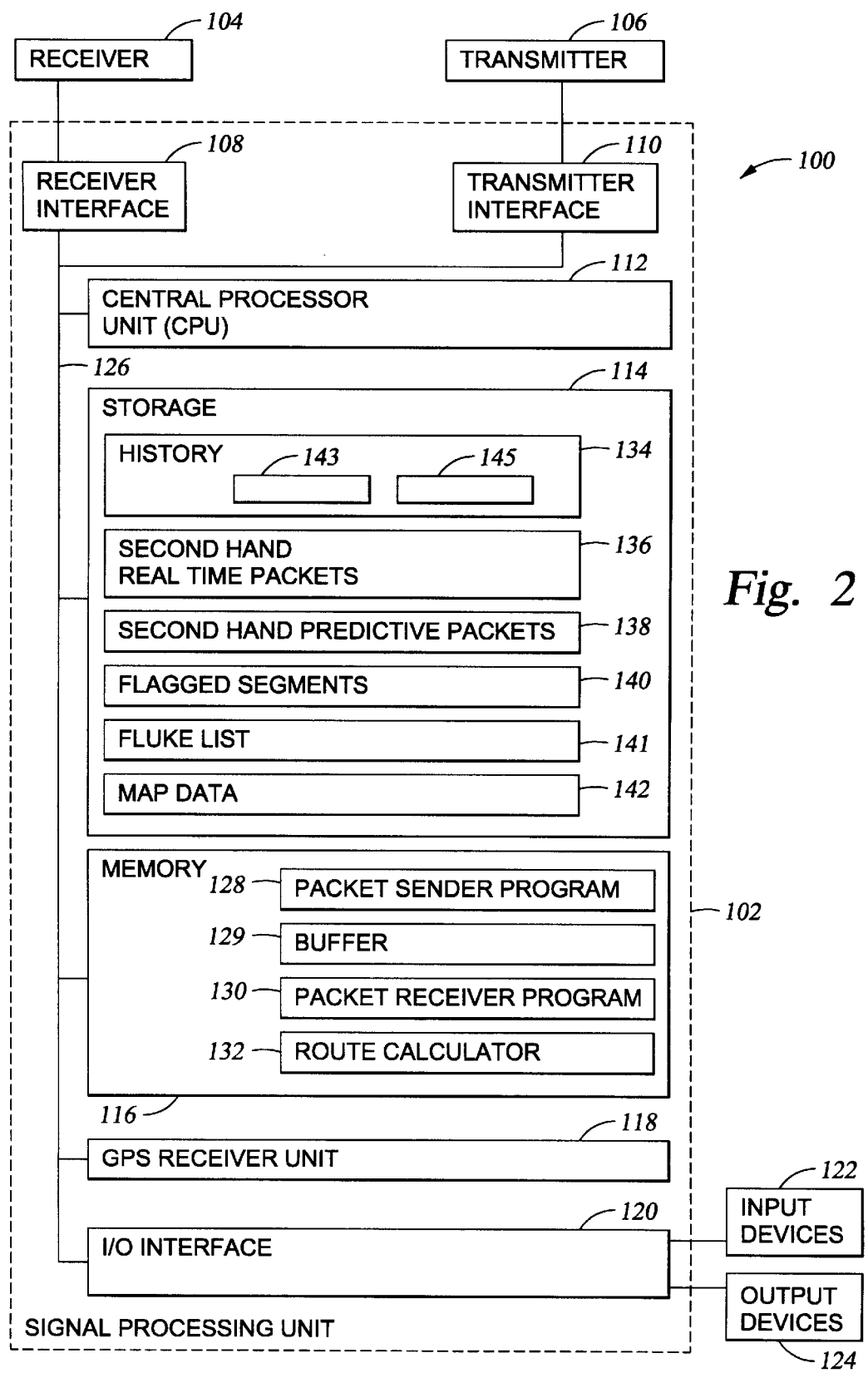
FIG. 2 is a schematic representation of a computer system of the invention.

FIG. 2 is a schematic representation of an exemplary onboard computer processing system 100 of the invention. The signal processing system 102 includes a receiver interface 108, a transmitter interface 11, a central processing unit (CPU) 112, storage 114, memory 116, a Global Positioning System (GPS) unit 118, and an I/O interface 120. The components of the signal processing system 102 are connected by a bus line 126. The I/O interface 120 may be any entry/exit device adapted to control and synchronize the flow of data into and out of the CPU 112 from and to peripheral devices such as input devices 122 and output devices 124. The input devices 122 can be any device adapted to provide input, such as configuration parameters, to the onboard computer processing system 102. For example, a keyboard, keypad, light pen, touch screen, button, mouse, trackball or speech recognition unit could be used. The output devices 124 can include a graphics/text display, etc. Although shown separately from the input devices 122, the output devices 124 and the input devices 122 could be combined. For example, a display screen with an integrated touch screen and a display with an integrated key word or a speech recognition unit combined with a text speech converter could be used.

Memory 116 is preferably a random access memory (RAM) sufficiently large to hold the necessary programming and data structures of the invention. While memory 116 is shown as a single entity, it should be understood that memory 116 may comprise a plurality of modules, and that the memory 116 may exist at multiple levels, from high speed registers and caches to lower speed but larger DRAM chips. In one embodiment, the memory 116 may include a packet sender program 128, a packet receiver program 130, and a route calculator 132. When executed on the CPU 112, the data contained in memory 116 is adapted to determine traffic patterns and to calculate a map route based upon the determined traffic patterns. The contents of memory 116 can be loaded from and stored to the storage 114 as needed by the CPU 112.

The storage 114 may include databases, such as a history database 134, a second hand real time packet database 136, a second hand predictive database 138, a flagged segments database 140, a fluke list database 141 and a map data database 142. The history database 134 may include for example first hand history data structure 143 and second hand history data structure 145.

As will be described in detail below, one embodiment of the invention is implemented as a program product for use with a computer system such as, for example, the onboard computer processing system 100 shown in FIG. 2. The program(s) of the program product defines functions of the preferred embodiment and can be contained on a variety of signal/bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

Figure 12:
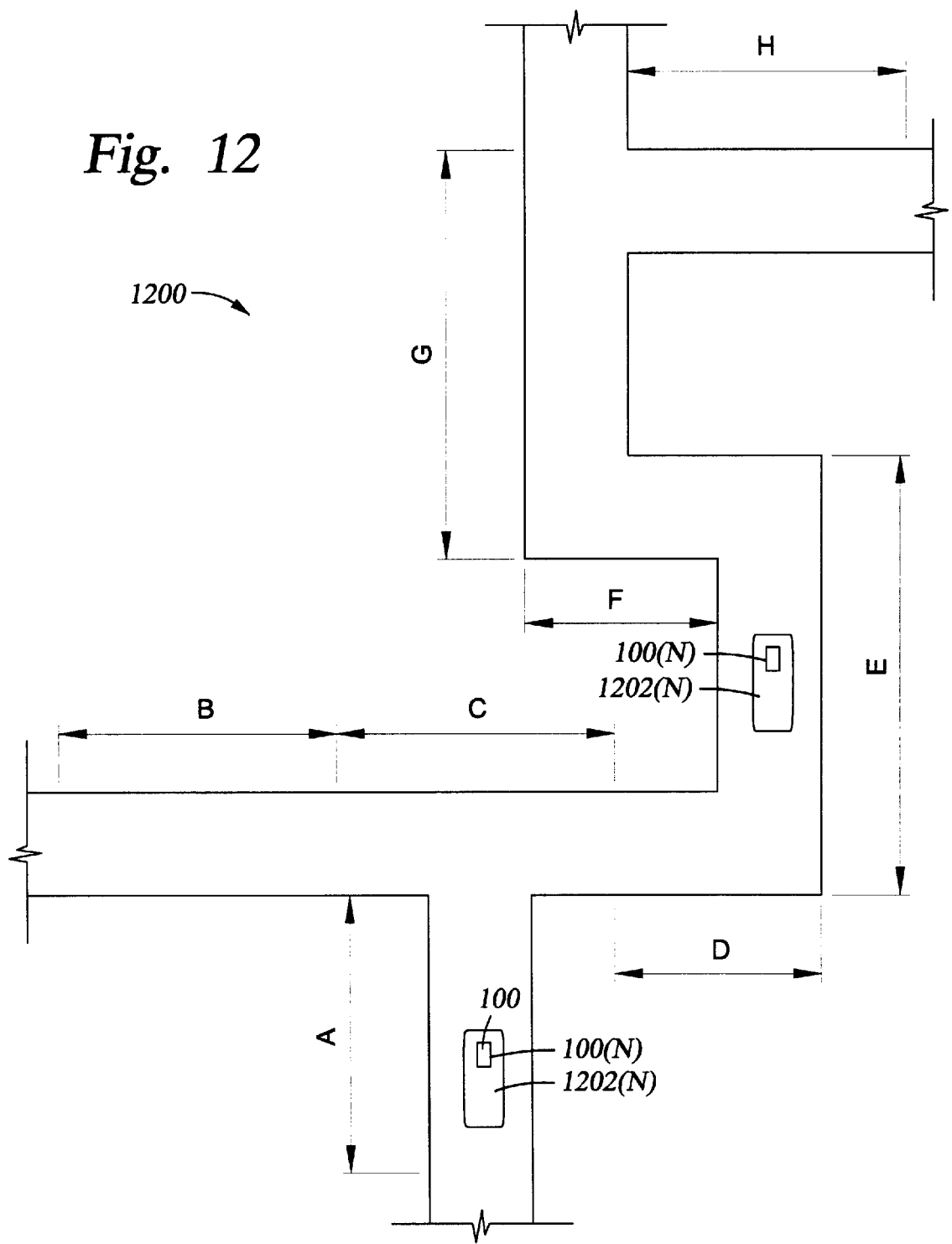
FIG. 12 is a schematic view of a plurality of road segments and vehicles having a system of the invention traveling thereon.

One embodiment of the invention will be described below with reference to road segments. Road segments include a defined area on a map or a defined segment along a particular road. The area defined as a road segment can be determined, for example, by information contained in the map data database 142. The map data database 142 may also provide information reflective of the posted speed along a particular road segment, such as an interstate highway, so that an acceptable time within a segment can be determined. One example of road segments is illustrated in FIG. 12. FIG. 12 is a schematic representation of a road grid 1200 comprising multiple road segments A-H. A road segment is a defined length of road having a known speed limit. Vehicles 1202(N) are shown traveling along the segments and each vehicle is equipped with systems 100(1)-(N). Each vehicle 1202(N) experiences traffic patterns on the segment being traversed and selectively collects and processes data. Where predetermined threshold conditions are met, each system 100(1)-(N) broadcasts all or portions of the information to other systems 100(1)-(N). The threshold conditions are stored as data on the systems 100(1)-(N) (specifically in the map data database 142) and generally include an acceptable time to traverse the segments based on the length of the segment and the posted speed limit. In one embodiment, all or a portion of the threshold conditions may be provided by a remotely located traffic information provider. Accordingly, the systems 100(1)-(N) establish a network of information processing units adapted to generate and distribute traffic pattern information. As will be described in detail below, in one embodiment information is initially exchanged between one or more of the systems 100(1)-(N) in order to validate a congested condition before broadcasting information as substantiating the congested condition. Such information sampling ensures that the broadcast information is accurate and not an aberration due to a condition of just one or a few cars, such as for example, a stalled vehicle.

Figure 3:
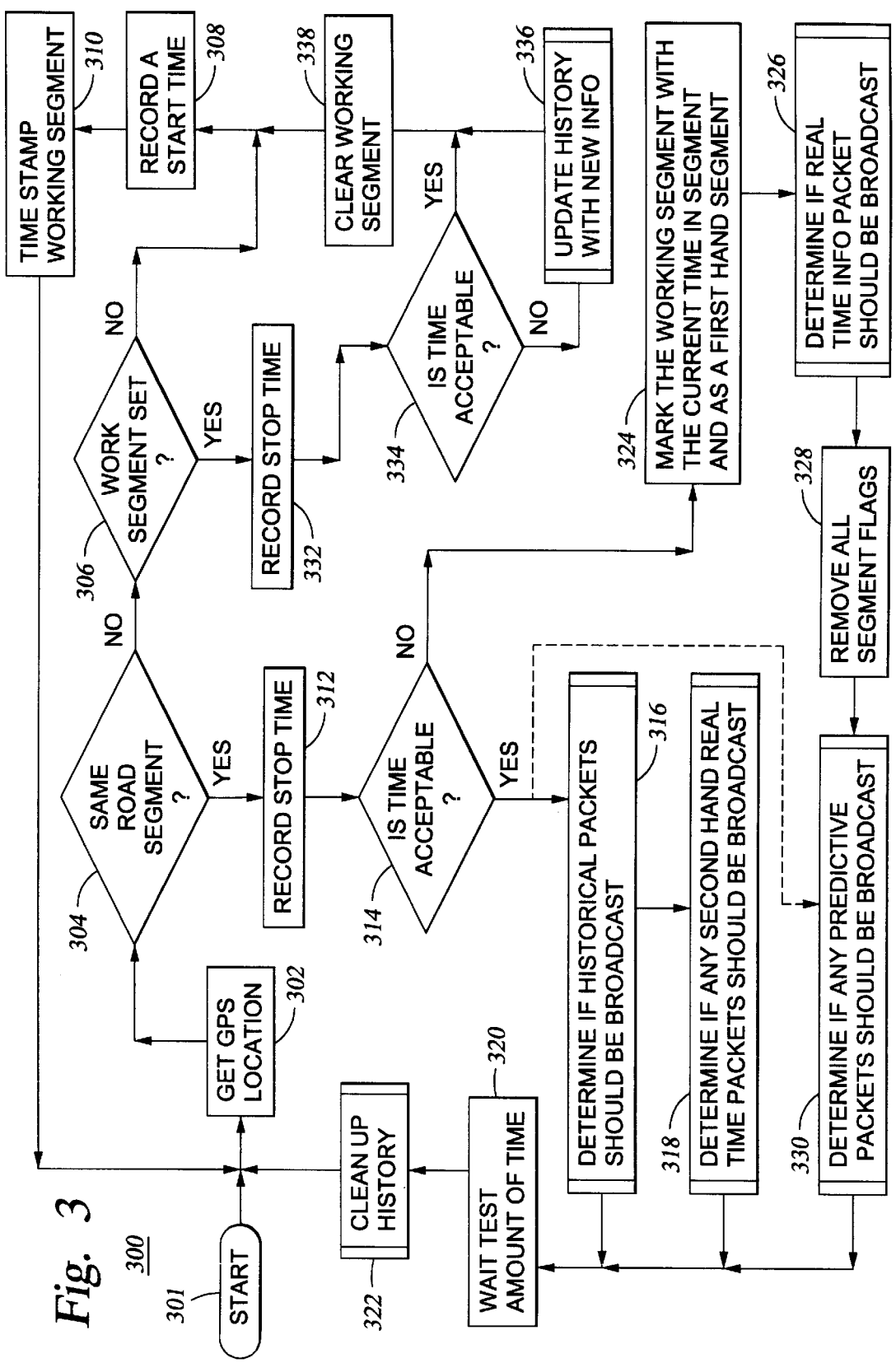
FIG. 3 is a flow diagram of a method of processing and selectively broadcasting information.

FIG. 3 is a flow diagram illustrating one embodiment of a method 300 for operating the system 100 disposed on a vehicle such as vehicles 50, 1202. The method is initiated at step 301 and the location of the vehicle is then determined at step 302 using the GPS unit 118 of the system 100. The GPS location is determined and mapped to a road segment provided in the map data.

After the GPS position has been mapped to a road segment, it is determined at step 304 whether the vehicle is in the same segment as the previous GPS location determined during a previous iteration of step 302. If the vehicle is not in the same road segment (such as when the system is first initiated or has exited the previous road segment and entered a new road segment), a determination is made at step 306 whether a working segment had been previously set. As used herein, a working segment is defined as a time interval during which the system 100 may experience one or more road segments. The inquiry at step 306 is made to determine if the system 100 has been operational for previous iterations of the method 300. If a working segment has not been set as determined at step 306, a working segment is set by recording a start time in the current segment at step 308. The working segment is then time stamped at step 310 to provide a time record for the system 100 in the road segment.

After a working segment has been set, a GPS location is again determined at step 302. A determination is again made at step 304 whether the GPS location is in the same road segment as the previous road segment. If the GPS location is in the same road segment, a stop time is recorded at step 312.

A determination is then made at step 314 whether the time in the road segment is acceptable. That is, a determination is made as to whether the elapsed time in the road segment indicates that the vehicle is moving at or near posted speeds. The time is determined by subtracting the start time in the road segment from the stop time and comparing this value with a known value for the road segment. If the system 100 has recently entered the road segment, the time should be acceptable for the first few iterations through this loop.

If the time is acceptable, a determination is made at step 316 whether to broadcast historical information. Historical information is information about a road segment which has been experienced by the sender and selectively broadcast to other vehicles for their use. The determination of whether to broadcast historical information will be described in detail below with reference to FIG. 7.

A determination is also made step 318 whether to broadcast second hand real time information. Second hand real time information is information received from another vehicle and stored in the recipient's history database. This determination will be described in detail below with reference to FIG. 8.

After the system makes the determination whether to broadcast historical or second hand real time information, the system waits a test amount of time at step 320 before continuing to step 322. At step 322, a determination is made whether to clean up the history database 134. A method of cleaning up the history database 134 will be described below in reference to FIG. 9. Generally, this step is performed to remove old information from the system 100 which may no longer be valid.

If the time in the segment has exceeded an acceptable limit at step 314, then the segment is marked at step 324 with the current time in the segment and as a first hand segment. Having determined an unacceptable road segment, the method 300 determines whether real time information about the road segment should be broadcast at step 326. Real time information is information about a current road segment which has been experienced by the sender and has been determined to be unacceptable. The determination of whether to broadcast real time information is described in more detail below in reference to FIG. 5. Generally, a determination is made as to whether the road segment has been confirmed as being unacceptable so that the segment can be flagged as bad and then information about the road segment broadcast.

Any flags which have been associated with the segment are removed at step 328 to prevent the system 100 from broadcasting information which may no longer be accurate. The system then determines whether to broadcast predictive information at step 330. Predictive information is generally defined as information about a traffic pattern which can be formulated based on a recognized pattern which is experienced. This determination is described in more detail below in reference to FIG. 6. The system then waits a test amount of time at step 320 before determining whether to clean up the history database at step 322. Following this determination, the system again determines the new GPS location of the system.

The system 100 continues to determine its location and the time acceptability of the road segment once it is started until it exits the road segment as determined at step 304. The method 300 then determines at step 306 whether a working segment has been set. If the system has been previously initiated and a working segment set, a stop time is recorded at step 332. The method 300 then determines whether the time in the previous road segment is acceptable at step 334. If the time is not acceptable, a determination is made at step 336 whether to update the history database. If the time is acceptable, the working segment is cleared at step 338.

FIG. 4 is a flow diagram illustrating how the history can be updated at step 336 of FIG. 3. The method 400 is initiated at step 401 once it has been determined that the time was unacceptable at step 307 in FIG. 3. The history is updated with information for the unacceptable segments. A determination is made at step 402 whether a first hand record, e.g., a record for the segment which has been experienced by the vehicle, can be found for the road segment in the time slot corresponding with the start time on the working segment. The time slot refers to a time window which encompasses a defined amount of time before and after a known time. If a record does not exist, a new history record is created at step 406 for information in working segment in the starting time slot. If a first hand record already exists, the record is appended with the new information at step 404.

The history may only contain those segments experienced that were bad. If a record is found and appended with new information indicating that a road segment was again unacceptable, then the record is marked or time stamped to validate the record. After a designated period of time, records in the history database 134 which are not continually updated or validated will be purged from the system by first being moved to the fluke list database 141. For example, if a record for a segment is stored to the history database 134 and is not verified again in a selected time period, e.g., ten days, then that record will be moved to the fluke list. If the record is not validated again within an expiration period selected for records in the fluke list, the record will be purged from the system 100. In this manner, the system continually updates the information stored therein. A method for maintaining the history database 134 will be described in more detail below with reference to FIG. 9.

Figure 5:
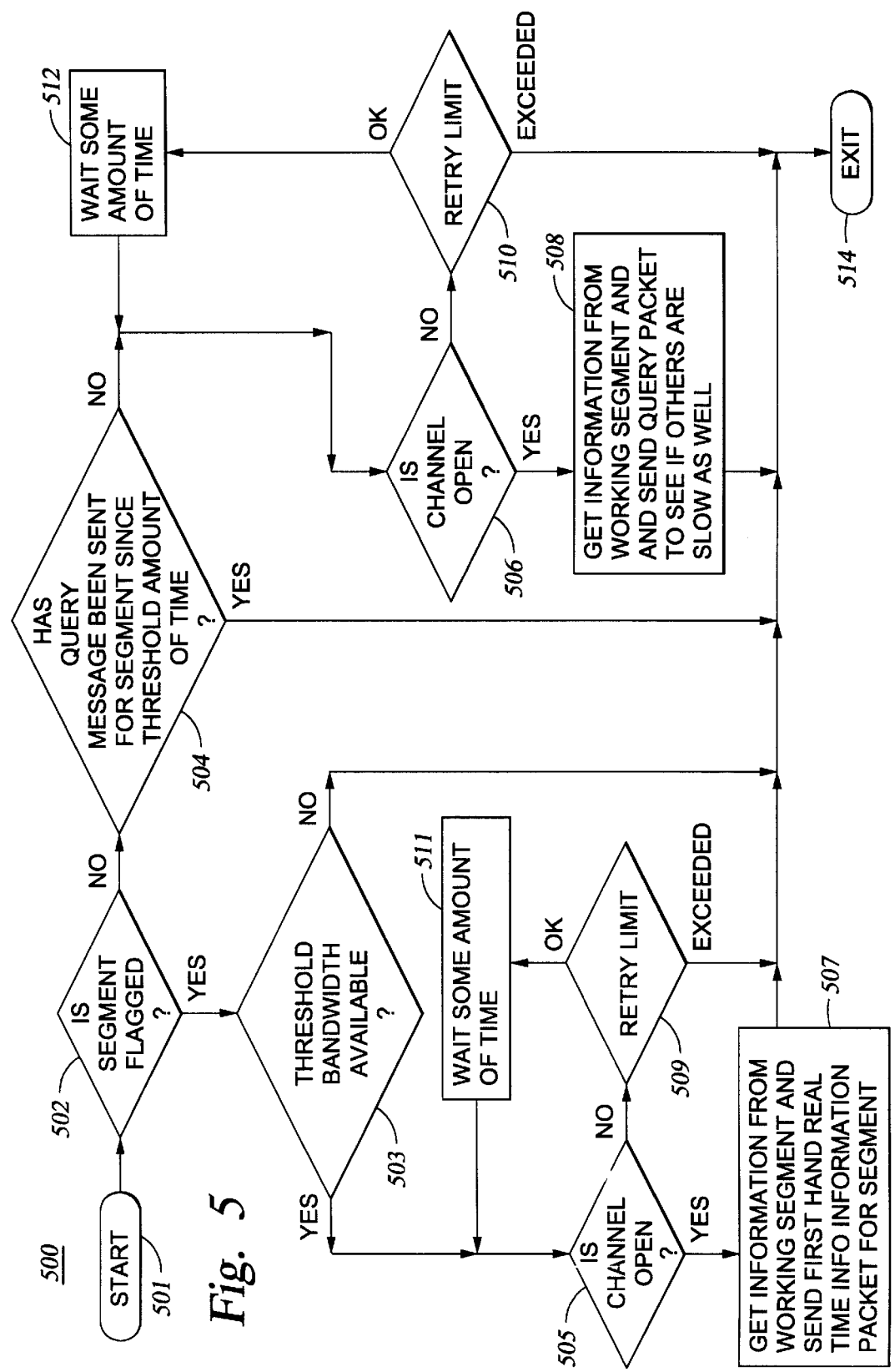
FIG. 5 is a flow diagram of a method of broadcasting real time information.

FIG. 5 illustrates one embodiment for determining when real time information should be broadcast at step 326 in FIG. 3. A determination is made at step 502 whether a segment has been flagged and verified as unacceptable. This determination is made to prevent information from being broadcast which is not indicative of actual traffic patterns. For example, a vehicle may remain in a segment for reasons other than traffic or congestion, e.g., a flat tire on a vehicle or other scheduled stop along a route. In one embodiment, segments are flagged by the system 100 in response to a query message. A query message is an inquiry to establish the status of other vehicles in an area to determine if a traffic condition exists which warrants formulation of a packet to be broadcast. A segment will not be flagged and information will not be broadcast if the system 100 has not received a query message from other vehicles confirming that an unacceptable condition does exist. In another embodiment, a segment is flagged if real time information about a bad segment is received from another system. These two embodiments of how a segment can be flagged and are described in more detail below with reference to FIG. 10.

If the segment is flagged, a determination of a threshold value for determining whether bandwidth is available for sending information is made at step 503. If the relationship determined at step 503 is less than a predetermined threshold value, the system 100 initiates a broadcast of the packet by determining if a broadcast channel is open at step 505. In one embodiment, determining whether a threshold value has been met is based on the amount of information (e.g., the number of packets) received by the system 100 within a period of time. If a channel is open, information on the working segment is obtained and a first hand real time information packet for the segment is sent at step 507. If the channels are busy as determined at step 505, a determination is made at step 509 whether a retry limit has been exceeded. If so, the system is exited at step 514. If a retry limit has not been exceeded, the method waits a pre-determined amount of time at step 511 and then a determination is again made at step 505 whether a channel is open. Steps 505, 509 and 511 are repeated until either the channel is open at step 505 or the retry limit is exceeded at step 509.

If the segment is not flagged as determined at step 502, a determination is made at step 504 whether a query message has been sent by the system 100 in a threshold amount of time. If a query message has not been sent, then it will be sent at this point. To send a query, a determination is made at step 506 whether a broadcast channel is open. If a channel is open, information on the working segment is obtained and a query packet is sent at step 508. If the channels are busy as determined at step 506, a determination is made at step 510 whether a retry limit has been exceeded. A retry limit of, for example, five can be set. If the retry limit is exceeded, the system is exited at step 514. If not, the method waits a pre-determined amount of time at step 512 and then a determination is again made at step 506 whether a channel is open.

Figure 6:
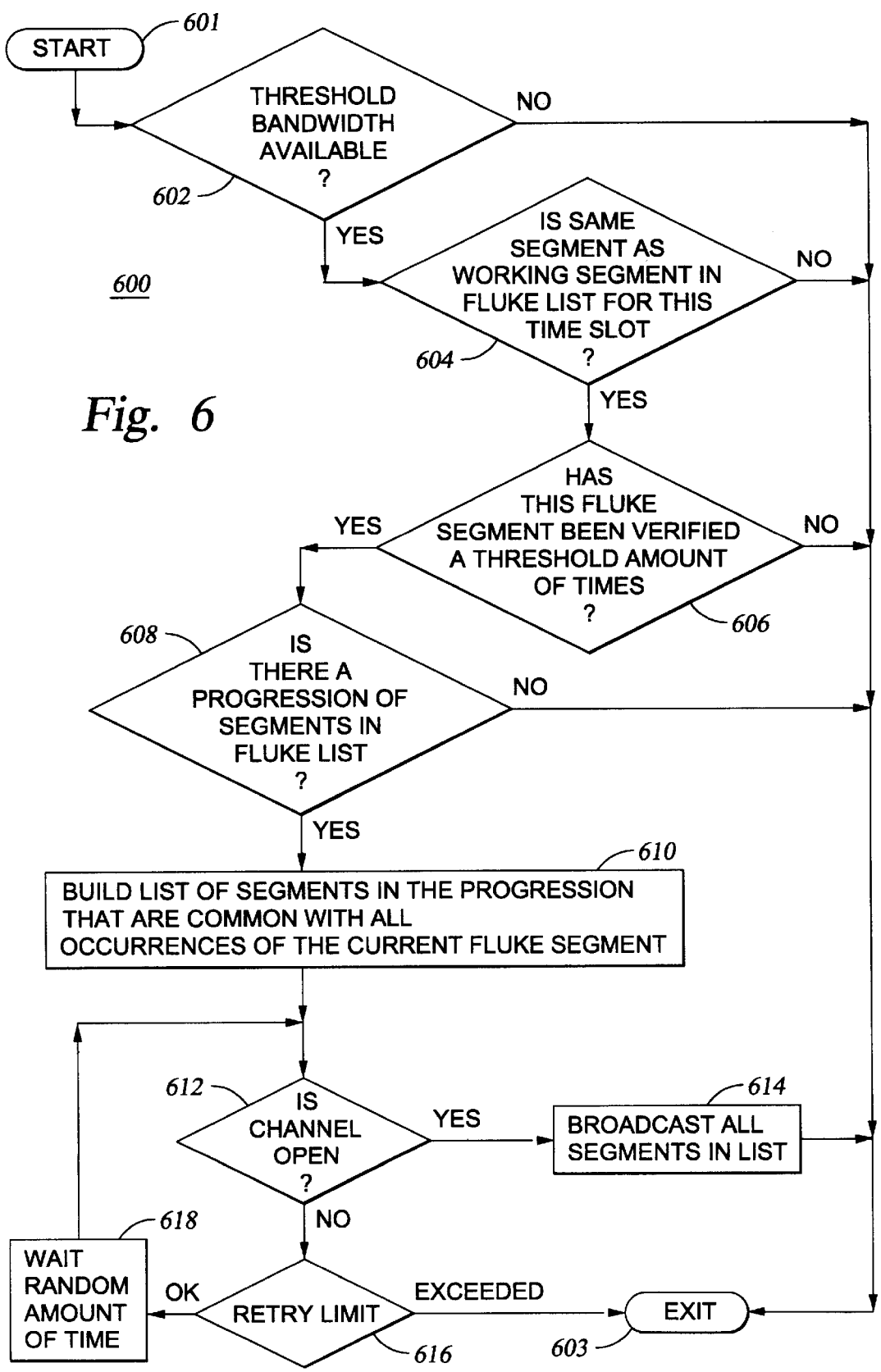
FIG. 6 is a flow diagram of a method of broadcasting predictive information.

FIG. 6 is a flow diagram of a method 600 illustrating when predictive information should be broadcast at step 330 in FIG. 3. The method 600 is initiated at step 601. A determination of the threshold bandwidth available is made at step 602. If the air waves are busy the method is exited at step 603. If bandwidth is available, a determination is made at step 604 whether the data for the segment being experienced as the current working segment exists in the fluke list database 141 for a pre-determined time slot relative to the current time. The time slot can be set to include time intervals of plus or minus fifteen minutes for example. The acceptable range of a time interval may be determined by a map provider or an operator. If the segment data is not in the fluke list, the method 600 is exited at step 603.

If the segment data is in the fluke list, a determination is made at step 606 whether this fluke segment data has been verified a threshold number of times, e.g. three (3). If not, the method is exited at step 603. If the segment in the fluke list has been verified a threshold number of times, a determination is made whether there has been a progression of segments in the fluke list for the time slots which follow the time slot in the working segment. That is, the system determines if a wave of traffic is occurring which would indicate the occurrence of a special event, such as a sporting event or other public or private gathering which may result in the occurrence of an abnormal traffic pattern. If not, the method 600 is exited at step 603. If there is a progression of segments in the fluke list, a list of segments in the progression that are common with all occurrences of the current fluke segment is compiled at step 610. A determination is then made at step 612 whether a broadcast channel is open. If a channel is open, the segments in the constructed list are broadcast at step 614 and the method is then exited at step 603. If a channel is not open, a determination is made at step 616 whether a retry limit has been exceeded. If so, the method 600 is exited at step 603. If a retry limit has not been exceeded, the method 600 waits a random or pre-determined amount of time at step 618 before again determining if the channel is open at step 612. If the channel is open, the segments list is broadcast at step 614. If the channel is not open and the retry limit has been exceeded, the method 600 is exited at step 603.

Figure 7:
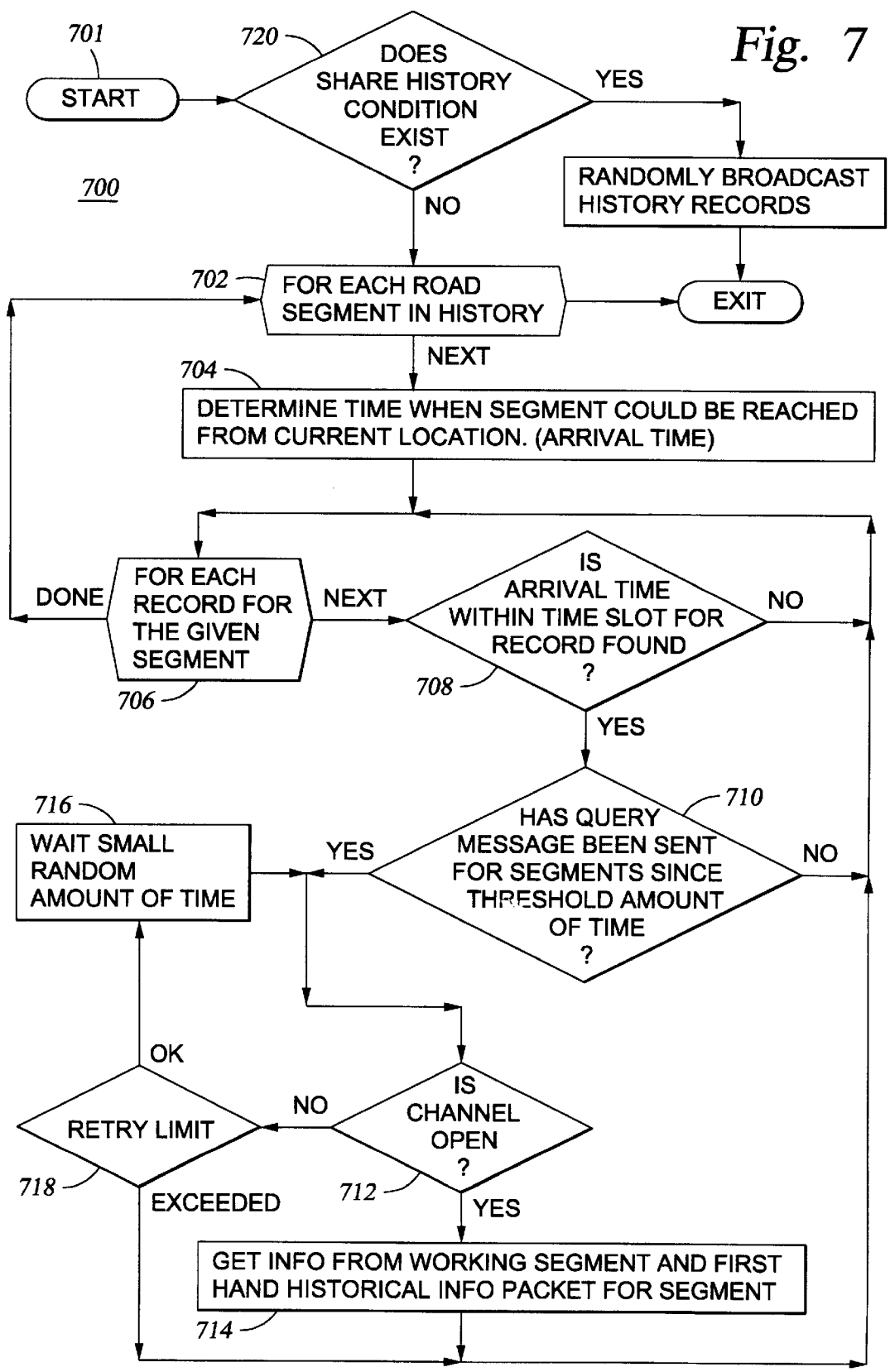
FIG. 7 is a flow diagram of a method of broadcasting historical information.

FIG. 7 is a flow diagram of a method 700 illustrating when historical information should be broadcast at step 316 in FIG. 3. Historical information is broadcast so that commuters who are going to enter those road segments experienced by other vehicles at the relevant time period can receive congestion information and plan their route accordingly. The method 700 is initiated at step 701. For each road segment in the history database 134 shown at step 702, a determination of the time the segment could be reached from the current location, known as the arrival time, is made at step 704. The method 700 loops through all of the history records and finds the segments in the history that have been bad (i.e., congested as determined by method 300) and then it is going to determine, based on the current position of the system 100, how long it will take the system 100 to reach that segment. For each record for the given segment shown at step 706, a determination is made at step 708 whether the arrival time is within the time slot for the record found. If not, the subroutine returns to 706 where the inquiry continues with the next record. If the arrival time is within the time slot for the record found, a determination regarding the number of packets found for the segment at the arrival time is made at step 710. If at least one packet is found, a determination is made at step 712 whether the channel is open. If so, historical data which relates to that road segment is compiled into a first hand historical packet and is broadcast at step 714. If the channel is not open, a determination is made at step 718 whether a retry limit has been exceeded. If the retry limit has been exceeded, the method 700 returns to 706. If the retry limit has not been exceeded, the method 700 waits a random or determined amount of time at step 716 then determines again at step 712 whether the channel is open.

In one embodiment, historical packets can also be exchanged between vehicles located in a central location for the night. In the case of rental cars, for example, each of the cars typically travels in multiple directions, thereby providing a good source of information to generate a database. The information is broadcast when a determination is made at step 720 that a "share information condition" exists. This condition can be random or based upon certain selection criteria such as a time and a date. The information that is randomly broadcast can be marked as auxiliary information so that the recipient of that information can process it accordingly and store the information if desired. This information can also be marked as it relates to a particular segment so that the recipient of the information can determine whether or not to accept it based upon the distance that particular segment is from the system at that particular time. A route calculator (discussed in detail below with reference to FIG. 11) could be operated to identify the route chosen by the operator and accept only those packets which relate to road segments which could be experienced in the routes chosen.

FIG. 8 is a flow diagram illustrating the broadcast of second hand real time information packets at step 318 of FIG. 3. Second hand real time information is defined generally as information received from other vehicles and stored in the history database 134. The method 800 is initiated at step 801 and second hand real time information packets for which an expiration time associated therewith has run are discarded at step 802. This prevents information which may not be valid from being broadcast. A determination regarding a threshold bandwidth is made at step 804. If the bandwidth is not acceptable, the method is exited at step 806. If there is sufficient bandwidth, a stored second hand packet is randomly selected at step 808. After a second hand packet has been selected, all other second hand packets for the same segment are located within a database at step 810. Next, it is determined whether the channel is open at step 812 so that the second hand packets can be broadcast. If the channel is open, the second hand packets are broadcast at step 814 for the segment. After the second hand packets have been sent, a determination is made at step 816 whether to randomly broadcast more second hand packets. If so, the method returns to 804. If not, the method 800 is exited at step 818. If the channel is not open at step 812, an inquiry is made at step 820 whether a retry limit has been exceeded. If so, the method is exited at step 818. If not, the method 800 waits a random or predetermined amount of time at step 822 before determining again whether the channel is open at step 812.

FIG. 9 is a flow diagram illustrating one embodiment of a clean up history function as determined at step 322 in FIG. 3. The method 900 is initiated at step 901. First hand history records contained in data structure 143 that have not been verified within a pre-determined time period, referred to as a first hand expire time, are moved at step 902 from the history database 134 to the fluke list database 141. Second hand history records contained in data structure 145 that have not been verified within a pre-determined time period, referred to as a second hand expire time, are moved at step 904 from the history database to the fluke list database. Next, records from the fluke list database that have not been verified within a predetermined time period, referred to as a fluke list expiration time, are deleted from the fluke list database at step 906. After the appropriate records have been moved or deleted, the method 900 is exited at step 908.

The expire time for each of the records is determined within the system 100 or may be configurable by the user if desired. The expire times may be, for example, one month. Also, weekday records may have expire times which are shorter than weekend records and vice versa. The former may be preferred because the information would be verified more often as a result of routine commuting to and from work. The records are verified if within the expire time the records are again validated. As first and second hand records expire and are moved to the fluke list database 141, the fluke list is created. If the segments in the fluke list are verified, the segments remain on the fluke list and can be used to compile predictive packets, for example. The fluke list expire time may be longer than the history expire time due to the random nature of the fluke list.

Figure 10:
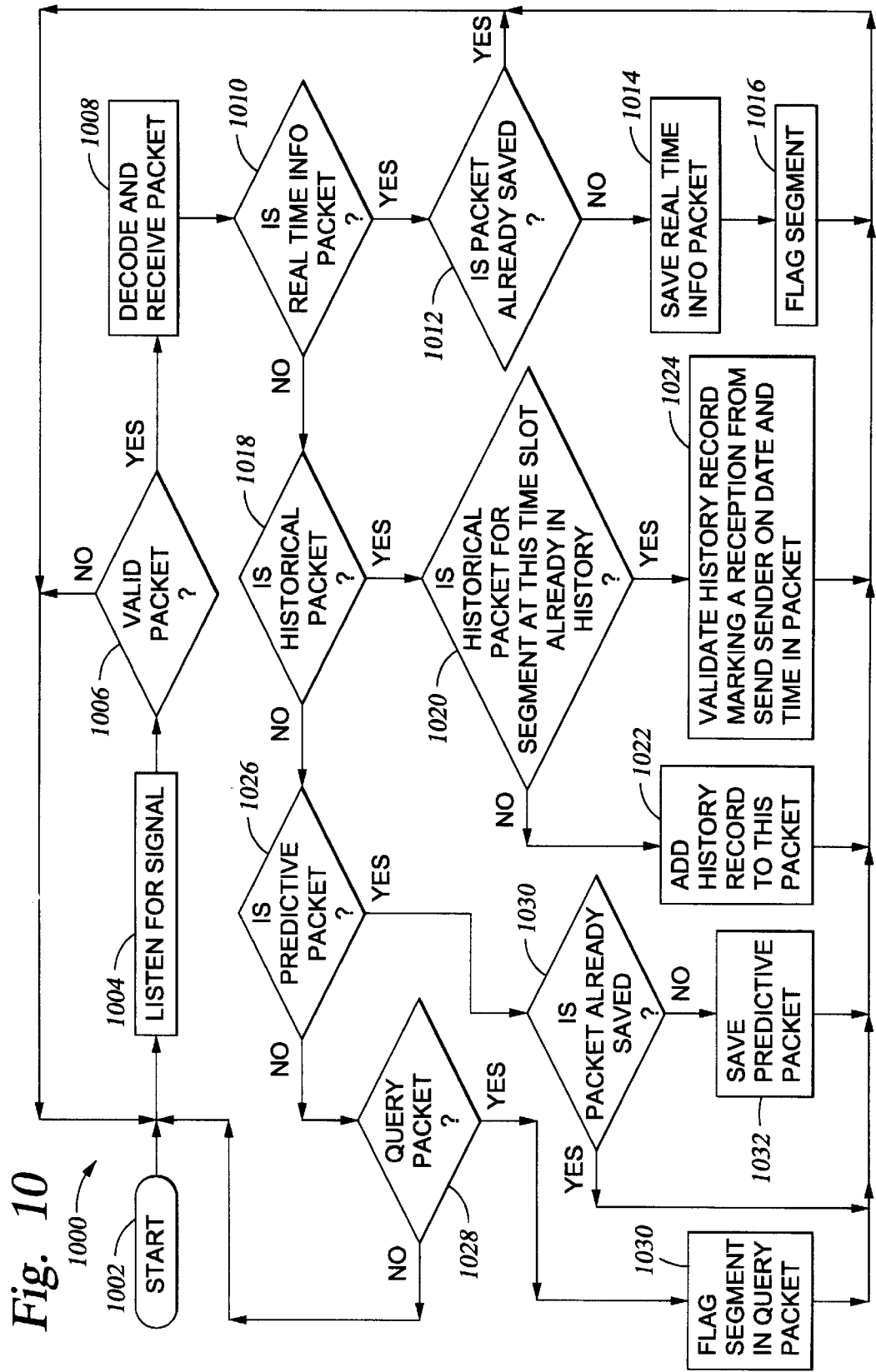
FIG. 10 is a flow diagram of a method of receiving information.

FIG. 10 is a flow diagram illustrating one example of how information broadcast by one system 100 is received and processed by another system 100. The method 1000 is initiated at step 1002. At step 1004, the receiver 104 listens for a signal carrying information broadcast from a remote source, such as another vehicle. If no signal is received, the system 100 continues to listen for a signal at step 1004. If a signal is received, a determination is made at step 1006 whether valid information has been received. Information can be marked with an identification code and a vehicle identification code as well. The packet is then decoded and received at step 1008.

A determination is made at step 1010 whether the information is a real time information packet. If the information is a real time information packet, a determination is made at step 1012 whether the packet has already been received and saved. If the packet had been received and saved, the method returns to the listening for a signal at step 1004. If the packet has not been received and saved, the packet is saved at step 1014 as second hand real time information packet. The segment is then flagged at step 1016 and the method 1000 returns to listening for a signal at step 1004. This received information can be used to validate that a bad condition has been experienced and to initiate a determination of whether packets should be sent.

If a determination is made at step 1010 that the information is not a real time information packet, a determination is made at step 1018 whether the information is a historical packet. If the information is determined to be a historical packet at step 1018, a determination is made at step 1020 whether the historical packet for the particular segment at the particular time slot is already in the history database 134. If not, a history record is added to the history database 134 at step 1022. If a record already exists, the existing history record is validated at step 1024 with the date and time the received segment occurred. It may also be determined whether the received historical packet was transmitted as a first hand or a second hand packet from the sender. The method 100 then continues by listening for a signal at step 1004.

If the received information is not a historical packet at step 1018, a determination is made at step 1026 whether the information is a predictive packet. If the packet received at step 1026 is a predictive packet, a determination is made at step 1030 whether the predictive packet has already been saved. If not, the packet is saved at step 1032. If the packet has been saved, the system 100 continues to listen for signals at step 1004.

If the packet received at step 1026 is not a predictive packet, a determination is made at step 1028 whether the information is a query packet. If not, the system continues to listen for a signal at step 1004.

If the received packet is a query packet, the segment contained in the query packet is flagged at step 1030 and the system continues to listen for signals at step 1004. The flagged segment can then be used to determine whether to send a real time information packet as described in FIG. 5. A query packet is an indicator that another vehicle experiencing this segment has determined that the segment is unacceptable and is seeking validation from other vehicles to confirm that the segment is unacceptable.

Figure 11:
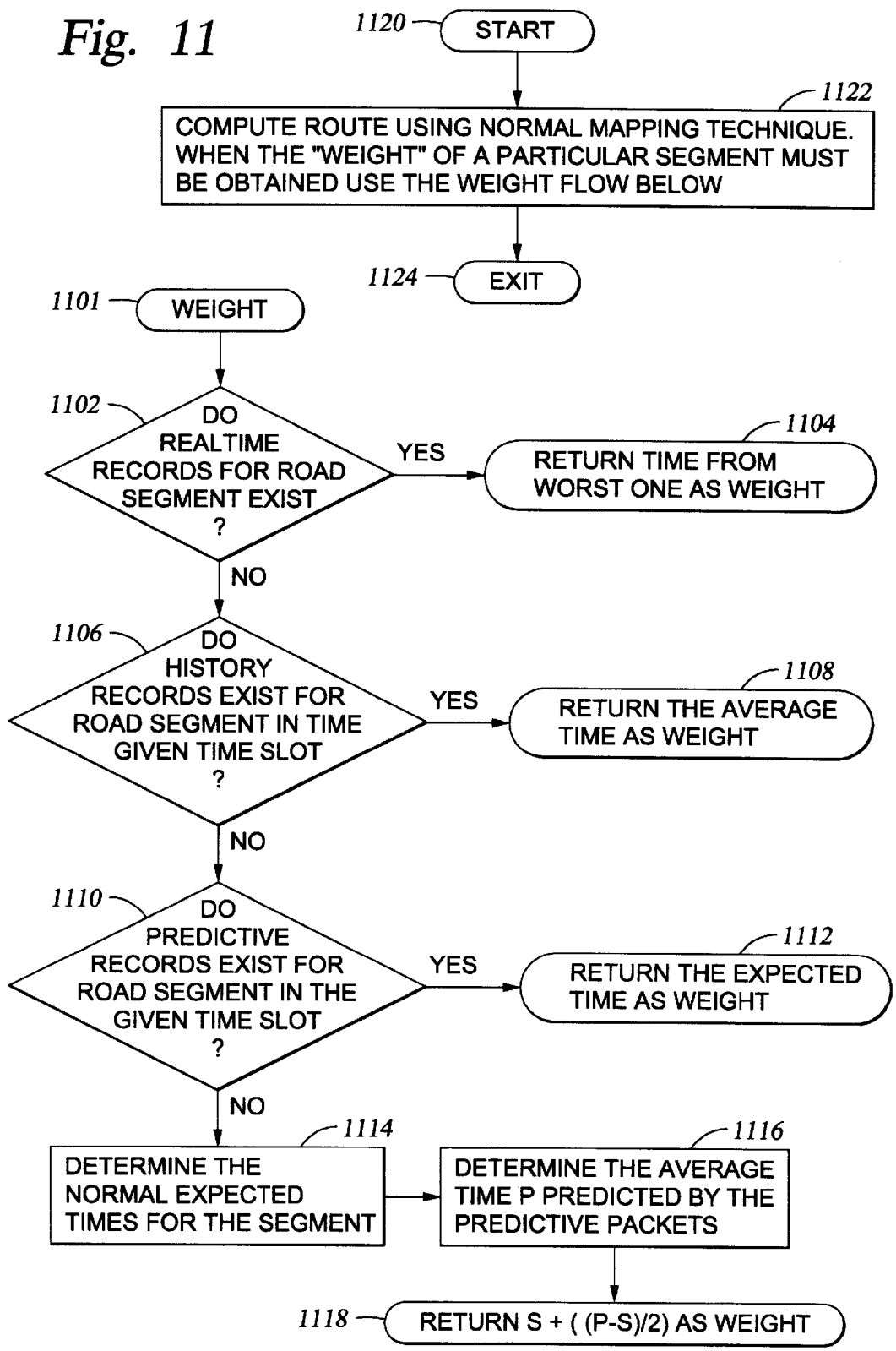
FIG. 11 is a flow diagram of a method of a route calculator.

FIG. 11 is a flow diagram illustrating one embodiment of a map route calculator. A conventional route map calculator can be modified as described herein to determine a route based upon traffic patterns which have been determined or received. The conventional system may use for example an artificial intelligence (AI) A* algorithm. A conventional map route calculator typically contains subroutines which assign a weight to a route which is the time it would take to travel an identified route. The information determined using the above described methods of detecting traffic patterns is utilized in the weight determination of the map route calculator.

The method 1100 of FIG. 11 begins at step 1101 and an initial determination is made at step 1102 whether real time records exist for a particular road segment. In one aspect, this information can be time limited so that only records received or generated within one hour, for example, are considered in this determination. Additionally, the information which is considered may be the information received from senders. If a real time record exists for a selected road segment, the value of the time for that segment is used at step 1104 as the weight for that segment in the map route calculation. The time value for a particular road segment can be an average if more than one record exists. A subroutine executing on the system 100 can calculate the average time for the segment and the average can be used for the weight of the road segment. Alternatively, or additionally, a threshold value could be set so that if a time value for a road segment is not acceptable and within a certain range, a weight value is automatically generated for the road segment. The system is configured so that a determination of the existence of real time records is a first priority. The real time records, if time limited, are associated with closely approaching road segments.

If a real time record does not exist, a determination is made at step 1106 whether any historical records for a selected road segment exist. These historical records may be records which have been received from senders for which no real time record is available. The time value for the historical record is then used at step 1108 as the weight for the road segment for which the value is associated. The value may be a single value, an average value or a threshold value as described above with reference to the real time records. The time a particular road segment will be reached can be associated with the time values stored in the historical records. As the route calculator is determining the route, an arrival time is associated with each road segment and a time value is associated with the segment. If a historical record exists for the predicted arrival time in a segment, that time value is used as the weight for the road segment. The road segments would preferably be taken sequentially with the first entered road segment first, the second entered road segment second, etc.

If there are no historical records for a road segment in a given time slot, a determination is made at step 1110 whether predictive records exist for the selected road segment in a given time slot. If a predictive record does not exist, the value stored in a data structure of the program as the normal time value for the segment is used as the weight in the route calculation. If a predictive record does exist for the road segment in the given time slot, a normal expected time S for the segment is determined from a stored data structure at step 1114 and an average time P predicted for the segment based on the predictive record is determined at step 1116. A determination of the time value for the segment, i.e., the weight, is determined at step 1118 by the equation: S+((P−S)/2).

The time values determined from any of the real time records at step 1104, the historical records at step 1108, the predictive records at step 1118 or the lack of records determined at step 1112 is used in the weight calculation at step 1122. The subroutine is initiated at step 1120 and the route is computed at step 1122 using the information provided from the above referenced methods.

The forgoing embodiment utilizes static elements, referred to as road segments, to advantage. The road segments are pre-defined and are universal to vehicles utilizing the system 100. In an alternative embodiment, the system and method could be implemented using a road segment which has not been pre-defined in the road map data, but is dynamically defined as the vehicle travels. For example, a road segment can be defined by each loop through the method 300 illustrated in FIG. 3. That is, a method could determine the rate of travel between identified GPS locations and calculate the rate of travel of the vehicle for the distance traveled. This travel time can then be compared to a known or calculated travel time for this measured segment which is based upon known posted speeds along the measured segment. In this manner, a determination is made regarding the traffic patterns along the route traveled.

While the foregoing is directed to the preferred embodiment of the present invention, other and further embodiments of the invention may be devised without departing from the basic scope thereof, and the scope thereof is determined by the claims that follow.

What is claimed is:

1. A computer system disposable on a vehicle, comprising:
    (a) one or more traffic information receivers and transmitters configured to receive and transmit traffic condition information;
    (b) a system location receiver configured to determine a position of the system; and
    (c) a signal processing unit comprising a processor and a memory coupled to the one or more traffic information receivers and transmitters and the system location receiver, wherein the signal processing unit is configured to:
        (i) determine a first position and a second position of the system along a road segment;
        (ii) determine an elapsed time between the first and second positions of the computer system;
        (iii) determine whether the elapsed time indicates a congested traffic condition along the road segment by comparing the elapsed time with a stored time value for the road segment; and
        (iv) selectively broadcast traffic condition information for one or more road segments via the one or more traffic information transmitters.

2. The computer system of claim 1, wherein the signal processing unit is further configured to store information about congested traffic conditions along a plurality of road segments.

3. The computer system of claim 1, wherein the one or more traffic information receivers are further configured to receive information about road segments from one or more remote computer systems.

4. The computer system of claim 1, wherein the signal processing unit is further configured to transmit information about the road segment to one or more remote computer systems via the one or more traffic information transmitters.

5. The computer system of claim 2, wherein the signal processing unit is further configured to store the traffic condition information in a database and determine a route using the information stored in the database.

6. The computer system of claim 1, wherein the signal processing unit is configured to selectively broadcast traffic condition information indicating a congested traffic condition for one or more road segments when confirmation information has been received from a remote source indicating that the remote source has detected the congested traffic condition.

7. The computer system of claim 1, wherein the signal processing unit is further configured to determine at least the rate of travel of a vehicle having the computer system disposed thereon and compare the determined rate of travel to an acceptable travel rate to determine if the rate of travel is acceptable; wherein the signal processing unit is configured to broadcast the traffic condition information via the one or more traffic information transmitters if the rate of travel is not acceptable.

8. The computer system of claim 7, wherein the signal processing unit is coupled to a Global Positioning System (GPS) receiver configured to determine a position of the computer system.

9. A method for processing traffic pattern information in a computer system disposed on a first vehicle, comprising:
    determining a first position for the first vehicle in a road segment at a first time;
    determining a second position for the first vehicle in a road segment at a second time;
    determining an elapsed time by comparing the first time and the second time;

determining whether a congested traffic condition exists for the road segment according to the elapsed time; and determining if congested traffic condition information should be broadcast when the congested traffic condition exists.

10. The method of claim 9, wherein determining the traffic condition comprises comparing the elapsed time to a threshold time.

11. The method of claim 10, wherein the threshold time is based on a speed limit and a length for the road segment.

12. The method of claim 9, wherein determining if the congested traffic condition information should be broadcast, comprises:

(i) for each record in the history data structure, determining an arrival time indicating when the road segment could be reached from a current location; then (ii) determining for each record if the arrival time is in a time slot for the record; and (iii) confirming that the records have been verified.

13. The method of claim 9, further comprising receiving second hand traffic condition information from a second vehicle.

14. The method of claim 13, further comprising calculating a route using the second hand traffic condition information.

15. The method of claim 9, wherein the traffic condition information is broadcast if confirmation information has been received from at least one second vehicle indicating that the second vehicle has experience the congested traffic condition.

16. A signal-bearing medium containing a program which, when executed by one or more processors, performs the steps comprising:

determining a first position for a first vehicle in a road segment at a first time;

determining a second position for the first vehicle in a road segment at a second time;

determining an elapsed time by comparing the first time and the second time; and determining whether a congested traffic condition exists for the road segment according to the elapsed time; and determining whether congested traffic condition information should be broadcast when the congested traffic condition exists.

17. The signal-bearing medium of claim 16, wherein the determining the first and second positions is accomplished using a Global Positioning System (GPS).

18. The signal-bearing medium of claim 16, wherein determining whether the congested traffic condition exist comprises comparing the elapsed time to a threshold time.

19. The signal-bearing medium of claim 18, wherein the threshold time is based on a speed limit and a length for the road segment.

20. The signal-bearing medium of claim 16, wherein the traffic condition information is broadcast if confirmation information has been received from a remote source indicating that the remote source has detected the congested traffic condition.

21. The signal-bearing medium of claim 16, further comprising, prior to determining whether congested traffic condition information should be broadcast:

if the congested traffic condition exists, storing the congested traffic condition information in a history data structure as a first hand history information record;

receiving second hand congested traffic condition information from one or more remote sources; and storing the second hand congested traffic condition information in the history data structure as a second hand history information record.

22. The signal-bearing medium of claim 21, wherein determining whether to broadcast the congested traffic condition information, comprises:

(i) for each record in the history data structure, determining an arrival time indicating when the road segment could be reached from a current location; then (ii) determining for each record if the arrival time is in a time slot for the record; and (iii) confirming that the records have been verified.

23. The signal-bearing medium of claim 21, further comprising:

if the congested traffic condition exists, storing the congested traffic condition information in a first data structure as first hand history information;

moving the history information from the first data structure to a second data structure when a threshold condition exists; and determining whether to broadcast the information contained in the second data structure.

24. The signal-bearing medium of claim 23, wherein the threshold condition exists if a time expiration event has occurred.

25. The signal-bearing medium of claim 21, further comprising receiving second hand traffic condition information from a second vehicle.

26. The signal-bearing medium of claim 25, further comprising calculating a route using the second hand traffic condition information.

27. A method for processing traffic pattern information in a computer system disposed on a first vehicle, comprising:

determining that a congested traffic condition exists in a road segment; and determining whether confirmation information has been received from at least one second vehicle indicating that the second vehicle has experienced the congested traffic condition; and if the confirmation information has been received, broadcasting the congested traffic condition information.

28. The method of claim 27, wherein determining that the congested traffic condition exists in a road segment comprises comparing a time to travel through the road segment to a threshold time.

29. The method of claim 28, wherein the threshold time is based on a speed limit and a length for the road segment.

* * * * *